US005365659A

United States Patent [19]

Ueda et al.

[11] Patent Number: 5,365,659

[45] Date of Patent: Nov. 22, 1994

[54] WIRING HARNESS FABRICATING SYSTEM

[75] Inventors: Koichi Ueda; Yutaka Nishide; Akira Gotoh, all of Osaka; Yoshio Takenami, Yokkaichi; Fujio Ogawa, Yokkaichi; Teiji Sakuma, Yokkaichi; Takashi Kobayashi, Yokkaichi; Tomokazu Itoh, Yokkaichi, all of Japan

[73] Assignees: Sumitomo Electric Industries, Ltd., Osaka; Sumitomo Wiring Systems, Ltd., Yokkaichi, both of Japan

[21] Appl. No.: 79,784

[22] Filed: Jun. 22, 1993

[30] Foreign Application Priority Data

Jun. 24, 1992 [JP] Japan .................................. 4-165666
Sep. 17, 1992 [JP] Japan .................................. 4-248300

[51] Int. Cl.[5] ........................ H01R 43/04; B23P 19/00

[52] U.S. Cl. ........................................ 29/863; 29/755; 29/749; 156/433

[58] Field of Search .......................... 29/755, 863, 749; 156/433

[56] References Cited

U.S. PATENT DOCUMENTS 4,476,629 10/1984 Suzuki et al. .......................... 29/863
4,677,734 7/1987 Bloch et al. ....................... 29/755 X
4,979,292 12/1990 Fukuda et al. .................. 156/433 X
5,082,253 1/1992 Suzuki et al. .
5,159,749 11/1992 Weigert et al. .................... 29/755 X
5,205,329 4/1993 Suzuki et al. ..................... 29/755 X

FOREIGN PATENT DOCUMENTS 0297017 12/1988 European Pat. Off. .
0495164 7/1992 European Pat. Off. .
1790008 4/1972 Germany .
1486404 9/1977 United Kingdom .
WO89/12900 12/1989 WIPO .

*Primary Examiner*—Carl J. Arbes
*Attorney, Agent, or Firm*—Beveridge, DeGrandi, Weilacher & Young

[57] ABSTRACT

The fabrication of wiring harnesses requires many steps, such as a wire laying out step of laying out electric wires coated with insulative sheaths in a laying out array and cutting with measured length, a stripping step of the insulative sheaths at the ends of the electric wires, a crimping step of pressing terminals together with the bared ends of the electric wires in crimp contact, an inserting step of inserting into connectors the terminals pressed in crimp contact, etc. This system has an apparatus for each step modularized, and a module incorporated in the system can be increased or decreased in number depending upon a type of the desired wiring harness. For example, it is assumed now that a wiring harness fabrication line consists of an automated wire laying out module (1), a stripping module (3), two terminal-crimping modules (5), and a terminal-inserting module (7). When the type of the desired wiring harness is changed, additional automated wire laying out module (1) and terminal-inserting module (7) are provided in this fabrication line, and eventually, there can be incorporated two of the automated wire laying out modules (1) and two of the terminal-inserting modules (7) in this fabrication line. Thus, the automated fabricating system according to the present invention is a system pliably adjustable to the change of a design of the wiring harness.

14 Claims, 12 Drawing Sheets

WIRING HARNESS FABRICATING SYSTEM

BACKGROUND OF THE INVENTION

1. Field of the Invention

The present invention relates to a fabrication system of a wiring harness, and more particularly, it relates to a wiring harness fabricating system which can be pliably adjustable to the change in a design of the wiring harness and the multi-item mixed flow production.

2. Description of the Prior Art

A wiring harness is an electric wiring system organized by a great number of wires, terminals, connectors, etc., and is incorporated in an automobile, copying machine, or the like.

A fabrication process of such wiring harness includes various steps of measuring and cutting wires, laying out wires, stripping insulative sheaths at the ends of wires, crimping terminals and bared wire end together for contacting, inserting a terminal to a connector receptacle, etc. Hence, it requires a great deal of labor and time to fabricate the wiring harness, and it has been highly desired to automate the fabrication process of the wiring harness.

An exemplary well-known automated fabricating machine of a wiring harness is disclosed in Japanese Examined Patent Publication Nos. 46489/1985, 54245/1989, 42085/1989, 15994/1990, 66790/1991, or the like. The automated fabricating machine as described in any of the above official gazettes is an assembly for conducting a specified step or several steps of fabricating a wiring harness, which is inflexible or fixed in processing capacity at each step.

Also disclosed is another prior art automated wiring harness fabricating machine in which several process steps can be conducted on an assembly line (e.g., see Japanese Unexamined Patent Publication No. 313870/1989). This type of automated wiring harness fabricating machine is an assembly unit in which several mechanism for fabrication steps and a conveyor mechanism of a specified length for conveying a wire lay-out board are incorporated cooperatively.

A wiring harness is restyled in relatively short cycles. Automobiles are, for example, changed minutely every other year and are usually restyled every four years. In such a change, main parts or bodies of the automobiles are changed, or electrical equipment for the automobiles are increased or decreased in number, or changed. With any increase, decrease or change in such electrical equipment as well as the change in the automobile main parts or bodies, the wiring harness used for the circuit wiring of such electrical equipment is naturally changed in design. Changing of a design of the wiring harness causes a complete change in a circuit configuration or a shape of a products.

Thus, the automated wiring harness fabricating machine must be that which is pliably adjustable to the change of the design of the wiring harness.

As mentioned above, however, the prior art automated wiring harness fabricating machine is inflexible in processing capacity at each process step and/or is an assembly unit where the conveyor mechanism of a certain length is cooperatively incorporated, and therefore, the wiring harness fabricated by the prior art apparatus is restrictive in sort and feature. Accordingly, there is a disadvantage that an automated apparatus which fabricates a wiring harness in a predetermined mode is useless to fabricate a wiring harness of a different design. Such a prior art automated apparatus cannot be pliably adjusted to the change of the design of wiring harnesses, and hence, it is necessary to improve the automated apparatus for fabricating such a new-design wiring harness. This brings about a problem, for example, that the operative time of the costly automated apparatus is too short to recover its manufacturing cost.

The multi-item mixed flow production is preferable to other manners, allowing for the practical fabrication procedure of a wiring harness; that is, a fabrication procedure is conducted for each of the several temporary binding units, and thereafter, several of the temporary binding units are united together to produce a finished product of the wiring harness.

For that purpose, various kinds of temporary binding units are first to be fabricated. In view of the enhancement of production efficiency, the various temporary binding units are preferably fabricated on parallel flows. With such a mode that after fabricating a mass of temporary binding units of the same type, a mass of them of another type are fabricated, a finishing stage of uniting the temporary binding units of all required kinds cannot be performed till the required temporary binding units are prepared for the finishing stage. This is because such a fabrication mode is of low production efficiency. In addition to that, a storage lot must be prepared for keeping the produced temporary binding units. Thus, the multi-item mixed flow production is desirable.

However, the prior art automated apparatus cannot fabricate the temporary binding units of different kinds on a mixed flow although it can fabricate the temporary binding units of the same kind which are all identical in the predetermined numbers of circuits and connectors. In other words, The prior art automated apparatus has a disadvantage that it is not suitable for the multi-item mixed flow production.

The present invention is devised to overcome the above-mentioned disadvantages.

SUMMARY OF THE INVENTION

It is an object of the present invention to provide an automated wiring harness fabricating system which is pliably adjustable to the change of a design of a wiring harness.

It is another object of the present invention to provide a wiring harness fabricating system which is suitable for the multi-item mixed flow production in view of the actual circumstances of the fabrication of a wiring harness.

In accordance with the present invention, the number of process modules for each process step can be increased or decreased depending upon capacity of a wiring harness to be fabricated. Thus, the present invention permits the wiring harness fabricating system to easily change a procedure on a fabrication line depending upon what kind of wiring harness is to be produced.

Also, in accordance with the present invention, any of process steps in a fabrication line can be increased or decreased in number as required, and therefore, dispersive processing times occupied on the steps can be evened out, and therefore, the fabrication line, as a whole, can be excellent in productive efficiency.

These objects and other objects, features, aspects and advantages of the present invention will become more apparent from the following detailed description of the present invention when taken in conjunction with the accompanying drawings.

DESCRIPTION OF THE PREFERRED EMBODIMENT

Figure 1:
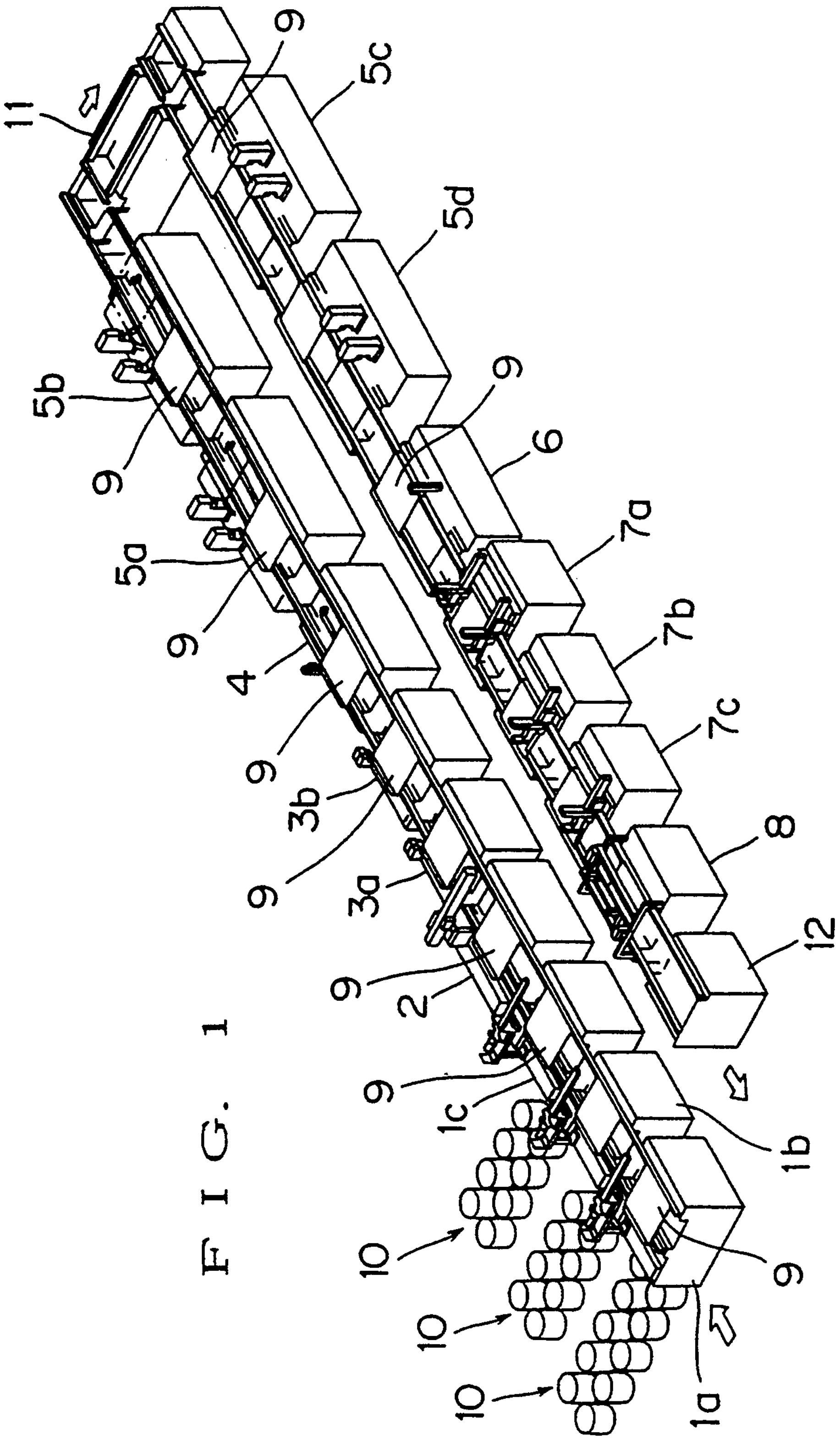
FIG. 1 is a perspective view showing the whole fabrication line of a wiring harness fabricating system of an embodiment according to the present invention.

FIG. 1 is a perspective view showing the whole fabrication line of an exemplary wiring harness fabricating system of the present invention. The fabrication line shown in FIG. 1 has a structure where apparatuses modularized for every process step are coupled in such an arrangement that each process step contains a specified number of the modularized apparatuses.

More specifically, the fabrication line of this embodiment is comprised of three automated wire laying out modules 1*a*, 1*b* and 1*c* (referred to as "automated wire laying out modules 1" en bloc hereinafter), an automated taping module 2, two stripping modules 3*a* and 3*b* (referred to as "stripping modules 3" en bloc hereinafter), a stripping check module 4, four terminal crimping modules 5*a*, 5*b*, 5*c* and 5*d* (referred to as "terminal crimping modules 5" en bloc hereinafter), a crimping check module 6, three terminal inserting modules 7*a*, 7*b* and 7*c* (referred to as "terminal inserting modules 7" en bloc hereinafter), and a conductivity checking module 8, all of which are serially coupled in this order. When a wiring harness is fabricated on this fabrication line, a predetermined wire lay-out board 9 is successively carried from module to module along a flow from the automated wire laying out modules 1 toward the conductivity checking module 8 so as to build up a wiring harness on the wire lay-out board 9.

The automated wire laying out modules 1 are apparatuses for automatically laying out electric wires on the wire lay-out board 9 and cutting electric wires with measured length. Specified kinds of electric wire groups 10 involved in the laying out are stored in the vicinity of the automated wire laying out modules 1. Electric wires of the electric wire group 10 are selectively taken in the automated wire laying out modules 1, laid out on the wire lay-out board 9, and then cut with measured length. In this embodiment, there are three of the automated wire laying out modules 1*a*, 1*b* and 1*c* disposed in series.

Given now that each individual one of the automated wire laying out modules 1 is capable of laying out with thirty kinds of electric wires different in color, thickness and the like, an arrangement which has three of the automated wire laying out modules 1 disposed in series can treat ninety kinds of electric wires for the laying out. Thus, this arrangement is adjustable to any variation in the laying out by increasing or decreasing the number of the automated wire laying out modules 1 depending upon which kinds of electric wires are to be laid out on the wire lay-out board 9.

The wire lay-out board 9, after wires are laid out by the automated wire laying out modules 1, is carried to the automated taping module 2 positioned downstreamwise in the fabrication flow, and a bundle of the electric wires laid out on the wire lay-out board 9 is taped up in predetermined positions so as not to be untidy.

Although there is only one automated taping module is provided in this embodiment, the automated taping module 2 may be increased in number so that many of them are connected in series if a taping capability in this fabrication line must be strengthened.

Then, the wire lay-out board 9 is carried to the stripping modules 3*a* and 3*b* connected in series to each other downstreamwise from the automated taping module 2. In the stripping modules 3, an insulative sheath at the end of each wires used for laying out on the wire lay-out board 9 is stripped.

In this embodiment, there are two of the stripping modules 3 connected to each other so as to strengthen a stripping capability of this fabrication line. If required, the number of the stripping modules 3 may be increased. If no such stripping capability is required, only one stripping module may be used.

After the step of stripping, the wire lay-out board 9 is carried to the stripping check module 4 connected downstreamwise from the stripping modules 3. The stripping check module 4 has, for example, a check camera to check if the end of the electric wire is stripped well, if the bared end of the electric wire is bent or untidy, and so forth. When it is found that the end of the electric wire is malstripped, the wire lay-out board 9 containing the malstripped end of the electric wire may be automatically removed from the fabrication line, or otherwise, a lamp may be utilized to inform that the malstripped end of the electric wire is detected.

There are four of the terminal crimping modules 5*a*, 5*b*, 5*c* and 5*d* connected in series downstreamwise from the stripping check module 4. In this embodiment, since the fabrication line makes a turn at a point downstreamwise from the second terminal crimping module 5*b*, a conveyor-buffer module 11 is interposed between the second terminal crimping module *5b* and the third terminal crimping module *5c*. In the conveyor-buffer module 11, the wire lay-out board 9 carried from the second terminal crimping module *5b* turns along a conveyor line and is further carried to the third terminal crimping module *5c*. Also, in the conveyor-buffer module 11, the wire lay-out board 9 is halted in the course of the conveyance for a predetermined period to regulate a timing of carrying the wire lay-out board 9 toward the third terminal crimping module *5c*.

In each of the four terminal crimping modules 5, the bared end of the electric wire having its core wire uncovered from the sheath and a terminal are pressed together in crimp contact with each other. The electric wires laid out on the wire lay-out board 9 include varieties depending upon a circuit necessary for a wiring harness, and they vary in thickness from filament to cable.

When an electric wire different in thickness is used, a terminal pressed together in crimp contact with the electric wire must be accordingly changed, and a crimper and a die for the terminal crimping must be changed in its width and pitch in accordance with the thickness of the electric wire. In this embodiment, there is provided an arrangement consisting of the four terminal crimping modules *5a*, *5b*, *5c* and *5d* so that, for example, eight kinds of electric wires different in thickness can be crimped to their respective optimum terminals. Each of the terminal crimping modules *5a*, *5b*, *5c* and *5d* has two terminal crimping heads, and two electric wires different in thickness from each other can be crimped to different terminals. Thus, if there are four of the terminal crimping modules 5, there are eight variations in terminal crimping to eight kinds of electric wires different in thickness.

The number of the terminal crimping modules 5 arranged at a time may be increased or decreased depending upon the number of kinds of electric wires.

The crimping check module 6 is coupled downstreamwise from the terminal crimping modules 5. The crimping check module 6 has, for example, a check camera to check if the end of the electric wire and the terminal are pressed together in good crimp contact with each other. It is also checked if the end of the electric wire crimped to the terminal is abnormally bent.

If a bad crimp contact of the electric wire with the terminal is detected by a check in the crimping check module 6, the wire lay-out board 9 which contains the electric wire suffering from the bad crimp contact may be automatically removed from the fabrication line as in the above case of the stripping check module 4, or otherwise, a lamp may be utilized, for example, to inform that the bad crimp contact with the terminal is detected.

The three terminal inserting modules 7 are connected in series to one another downstreamwise from the crimping check module 6. The terminal inserting modules 7 are apparatuses for automatically inserting into a connector receptacle the terminal crimped to the end of the electric wire. There are three of the terminal inserting modules 7 so as to be adjustable to kinds of the terminal inserted into the connector receptacles. The first terminal inserting module *7a* inserts the terminal of a-type into the connector receptacle, the second terminal inserting module *7b* inserts the terminal of b-type into the connector receptacle, and the third terminal inserting module *7c* inserts the terminal of c-type into the connector receptacle, for example.

The terminal inserting modules 7 may be increased in number when increased kinds of terminals are to be used; or they may be decreased when decreased kinds of terminals are to be used.

The conductivity checking module 8 is coupled downstreamwise from the terminal inserting module 7. In the conductivity checking module 8, a checking coupler is connected to connector receptacle where the terminal is inserted to conduct a conductivity check to the electric wire used for the laying out. When the wire lay-out board 9 containing the electric wire of poor conductivity is found by the conductivity check, the wire lay-out board 9 may be automatically removed from the fabrication line. An extra arrangement may be provided to inform that poor conductivity is detected.

A buffer module 12 is coupled downstreamwise from the conductivity checking module 8, and the wire lay-out board 9 carried to the buffer module 12 is transferred to the next fabrication stage because the required processing in this fabrication line is completed.

Common structural features of the modules will now be described.

Any of the modules (including the step of checking) each of which conducts processing for each process step can be increased in number as required at a time. The order of the coupling of the modules can be changed in any sequence as the wiring harness fabricating process requires. The requirement for the modules to be pliably coupled to others is that all the modules have common structural features which allow them to be freely coupled to each other.

In this embodiment, the modules are provided with a common conveyor mechanism to implement the modules which can be freely coupled to each other as mentioned above.

Figure 2:
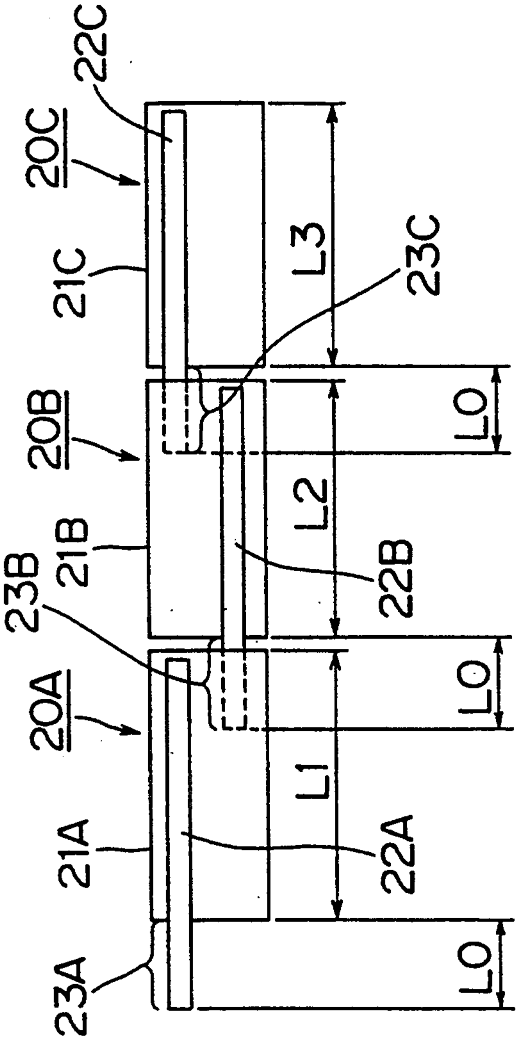
FIG. 2 is a diagram illustrating a structure where three modules are connected in series, presented for illustrating a common structure of the modules.

FIG. 2 is a diagram illustrating an arrangement where three modules 20A, 20B and 20C are connected in series. The modules 20A, 20B and 20C include common arrangements like base frames 21A, 21B and 21C and conveyor apparatuses 22A, 22B and 22C (hereinafter the alphabetical symbols A, B and C suffixed to the numerals 20, 21, 22 are omitted when the modules, base frames and conveyor apparatuses are referred to en bloc).

One of features of the common arrangement is that the conveyor apparatus 22 provided in the base frame 21 has a projecting portion 23 extending outward from an edge of the base frame 21 with a predetermined length L0. The projecting portion 23 can intrude into the next module upstreamwise the fabrication line in this embodiment. In this way, the wire lay-out board can be conveyed without trouble in case where the wire lay-out board is to be carried from the module 20A downstreamwise to the module 20B. There is another advantage that an additional conveyor apparatus does not have to be provided between the module 20A and the module 20B.

The projecting portion 23 may intrude not into the upstreamwise module but into the downstreamwise module.

Another feature of the above-mentioned common arrangement is that the conveyor apparatuses are not aligned among the modules coupled to one another; that is, the conveyor apparatuses 22A, 22B and 22C are positioned on alternately the left half and the right half of the base frames about the center line of the widthwise extension of the base frames; for example, the conveyor apparatus 22A is on the left half of the widthwise extension of the base frame 21A, the conveyor apparatus 22B is on the right half of the widthwise extension of the base frame 21B, and the conveyor apparatus 22C is on the left half of the widthwise extension of the base frame 21C. With such an arrangement, the projecting portion 23 intruding into the upstreamwise module 20 would never bump against the conveyor apparatus 22 provided in the module 20, and moreover, since the projecting portion 23 of the length L0 partially overlaps with the conveyor apparatus 22 of the upstreamwise module 20 in parallel, the wire lay-out board can be transferred, for example, from the conveyor apparatus 22A in the upstreamwise module like the module 20A to the conveyor apparatus 22B in the downstreamwise module 20B.

Lengths L1, L2 and L3 of the base frames 21 in the respective modules 20 may vary from module to module or may be equal to one another. Widths of the base frames 21 in the respective modules may also vary from module to module or may be equal to each other.

A common arrangement of the modules 20 will be described below in conjunction with a sample structure.

Figure 3:
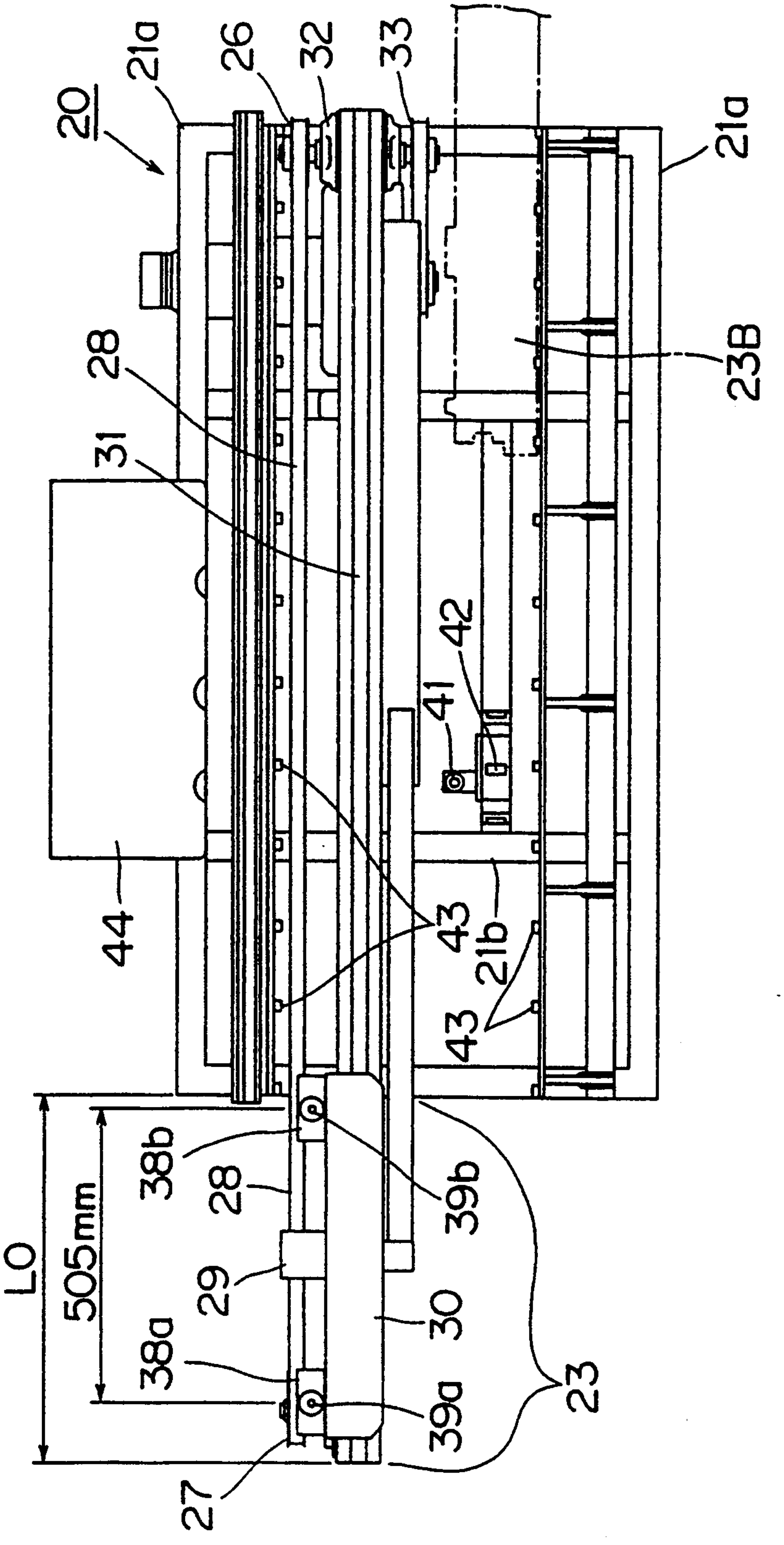
FIG. 3 is a plan view showing a common structure of the modules used in the system according to the invention.
Figure 4:
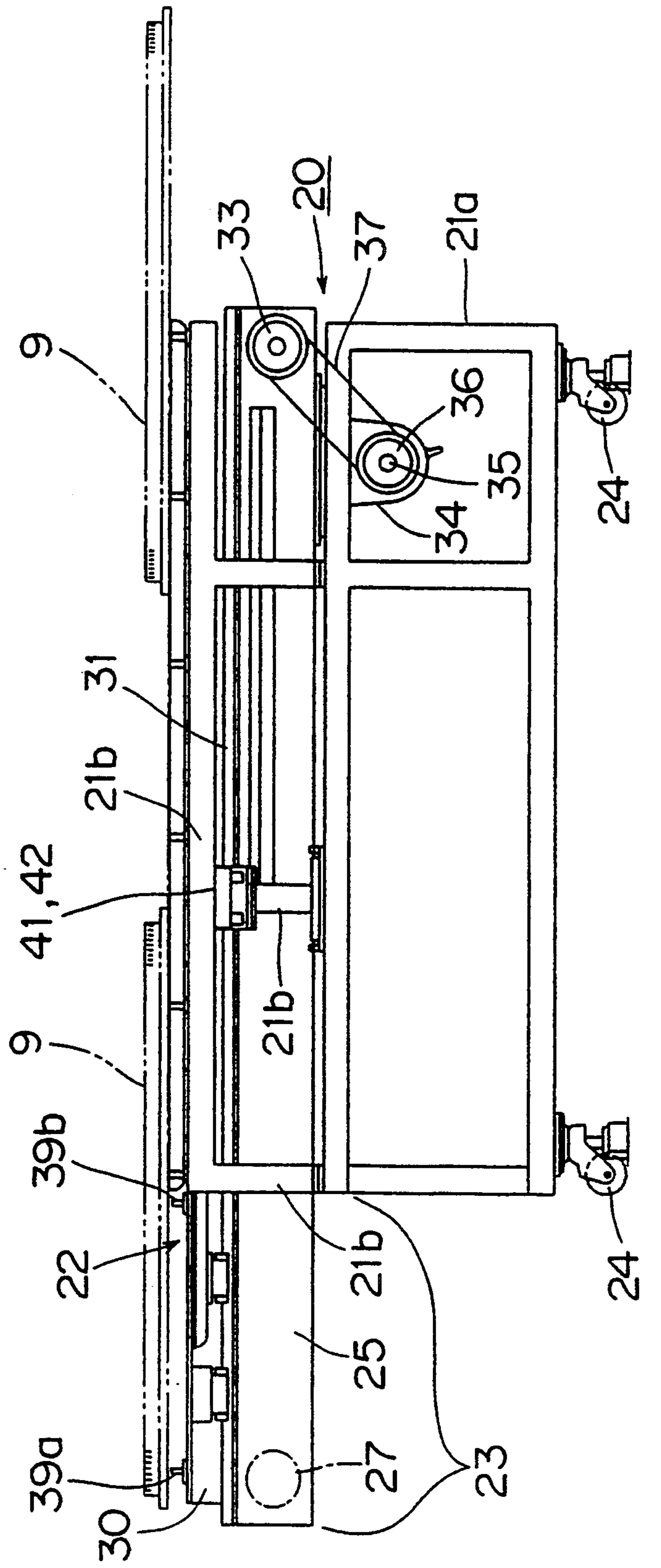
FIG. 4 is a front view showing the common structure of the modules used in the system according to the invention.
Figure 5:
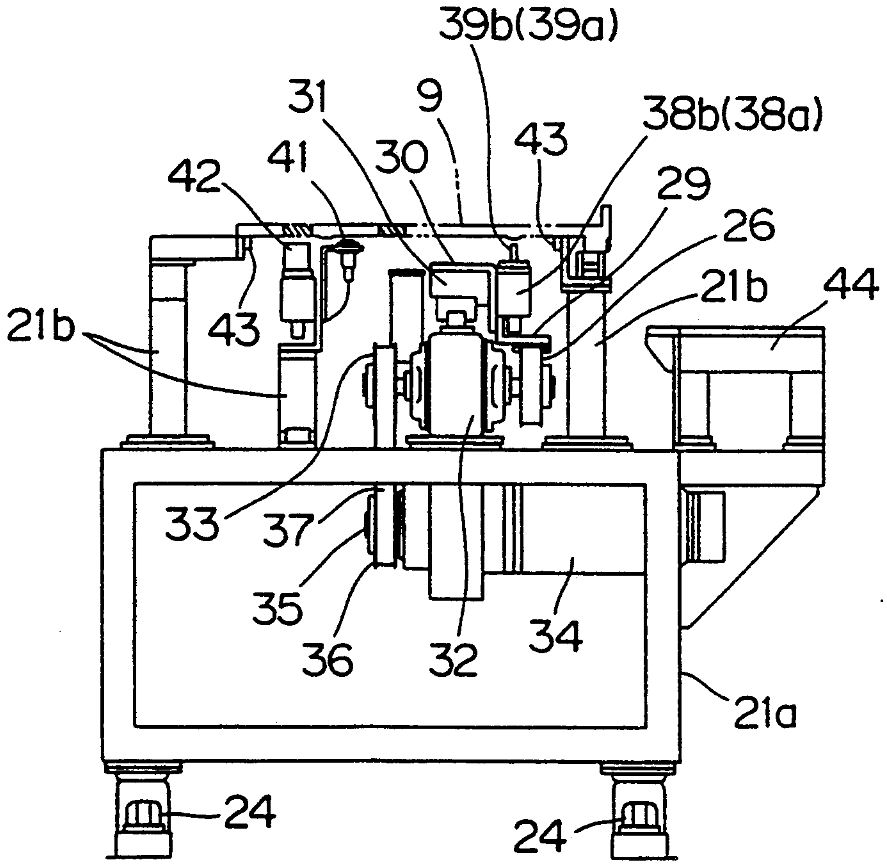
FIG. 5 is a right side view showing the a common structure of the modules used in the system according to the invention.

FIG. 3 is a plan view showing common arrangement of the modules, FIG. 4 is a front view of the same, and FIG. 5 is a right side view of the same. Referring to FIGS. 3 to 5, the module 20 includes a lower base frame **21*a* having a shape of a rectangular parallelopiped and an upper base frame 21*b* mounted on the lower base frame and four casters 24 with stoppers are attached to the bottom of the lower base frame 21*a*. Thus, both the lower base frame 21*a* and the upper base frame 21*b*** can be easily moved to a desired position and kept immovable in position.

The conveyor apparatus 22 has an elongated mounting member 25 fixed on the lower base frame **21*a*. The mounting member 25 is provided with a first pulley 26 on its right terminal and a second pulley 27 on its left terminal, and a conveyor timing belt 28 stretches between the first pulley 26 and the second pulley 27**.

The first pulley 26 is interlocked with a timing pulley 33 attached through a bearing mechanism 32. A servo motor 34 for driving the conveyor apparatus 22 is mounted in the lower base frame **21*a*. A drive pulley 36 is attached to a rotation shaft 35 of the servo motor 34, and a timing belt 37 extends between the drive pulley 36 and the timing pulley 33. Thus, the rotation force of the servo motor 34 is transmitted through the timing drive pulley 36 and the timing belt 37 to the timing pulley 33, the rotation of the timing pulley 33 is transmitted through the bearing mechanism 32 to the first pulley 26, and the rotation of the first pulley 26 permits the conveyor timing belt 28** to move.

A movable member 30 is attached to the conveyor timing belt 28 through a connecting member 29. A guide rail 31, which is held above the mounting member 25 and extends in parallel with the conveyor belt 28, guides the movable member 30 so that the movable member 30 can be freely moved in the lateral directions in FIGS. 3 and 4. Thus, as the conveyor timing belt 28 is moved, the movable member 30 connected to the conveyor timing belt 28 via the connecting member 29 is moved in the lateral directions according to the movement of the conveyor timing belt 28.

The movable member 30 has an extension of a predetermined length in its movable directions, and two pin units **38*a* and 38*b* are fixed thereto at a predetermined interval along the movable directions. The pin units 38*a* and 38*b* have positioning pins 39*a* and 39*b*, respectively, which are vertically moved by a hydraulic cylinder. A distance between the positioning pins 39*a* and 39*b* is preset, for example, 505 mm. The positioning pins 39*a* and 39*b*** are raised so as to engage with feed holes formed in the wire lay-out board as mentioned later.

As stated above, using two positioning pins 39 and settling those pins 39 at a predetermined interval bring about an advantage that the wire lay-out board can be accurately positioned and never be unsteady when it is conveyed. With a single positioning pin alone, the wire lay-out board might be shaky in the conveying direction and orthogonal direction thereto while it is being conveyed, but providing the two positioning pins **39*a* and 39*b* at the predetermined interval therebetween as in this embodiment allows the wire lay-out board to be accurately positioned by the positioning pins 39*a* and 39*b*** and to be conveyed without shaking.

In a variation of this embodiment, there may be three or more of the positioning pins 39, so that the wire lay-out board can be positioned by so many pins and conveyed.

A single positioning pin 39 might be enough if the conveyor apparatus is provided with a conveyor guide which prevents the wire lay-out board from shaking in the orthogonal direction to conveying direction during the conveyance.

A feature of the module 20 is that a left end (in FIGS. 3 and 4) of the conveyor apparatus 22 acts as the projecting portion 23 which projects to the left from edges of the base frames **21*a* and 21*b*. An extension of the projecting portion 23 from the edges is determined to L0 (e.g., L0 is sized by adding a predetermined margin $\alpha$ to the interval 505 mm between the two positioning pins 39*a* and 39*b* ; that is, $L0 = 505\text{ mm} + \alpha$), the right positioning pin 39*b* of the two positioning pins 39*a* and 39*b* fixed to the movable member 30 can run out of the guide frames 21*a* and 21*b* under the condition that the movable member 30** is in its most leftward position.

When an additional module is coupled to the module 20 on its left side, the projecting portion 23 intrudes into the base frame of the module, and the two positioning pins **39*a* and 39*b* in the projecting portion 23 receive the wire lay-out board carried into the additional module to take it in the module 20**.

The module 20 further includes a proximity sensor 41 provided in the upper base frame **21*b* for temporarily detecting the wire lay-out board, and a cylinder 42 provided in the vicinity of the proximity sensor 41 for temporarily halting the wire lay-out board. In FIGS. 3 and 4, as the wire lay-out board is carried from the left, a leading end of the wire lay-out board is detected by the proximity sensor 41. An output of the detection result from the proximity sensor 41 is applied to a cylinder control apparatus (not shown), and the cylinder 42 is lifted in response to the output from the proximity sensor 41. Then, the leading end of the wire lay-out board bumps against the lifted cylinder 42** and halts.

The feed holes are formed in a reverse side of the wire lay-out board in positions opposed to the positioning pins **39*a* and 39*b*, and therefore, the positioning pins 39*a* and 39*b* are, when raised, inserted into the feed holes in the wire lay-out board. After that, the cylinder 42** is lowered.

In the upper left of FIG. 4, two-dot-dash line expresses the wire lay-out board 9 lying in its initial halt position. In the upper right of FIG. 4, two-dot-dash line expresses the wire lay-out board 9 lying in its most rightward position through the conveyance.

In such a condition, since the projecting portion 23B of the conveyor apparatus in the next module coupled to the module 20 on its right side intrudes into the module 20 as expressed by two-dot-dash line in FIG. 3, the wire lay-out board 9 is received on the conveyor apparatus (on its projecting portion 23B) in the next module and transferred to the further next module.

In FIGS. 3 and 5, reference numeral 43 denotes a roller retaining opposite ends of the wire lay-out board during the conveyance of the wire lay-out board.

Also in FIGS. 3 and 5, reference numeral 44 denotes a processing mechanism mounting plate. In assembling the module 20 so as to act as a stripping module, a stripping mechanism is mounted on the processing mechanism mounting plate 44. The mounting plate 44 is located in an exemplary position in FIG. 3, and it may be replaced with a larger one depending upon a kind of the processing mechanism to install thereon or may be placed in another position.

Figure 6:
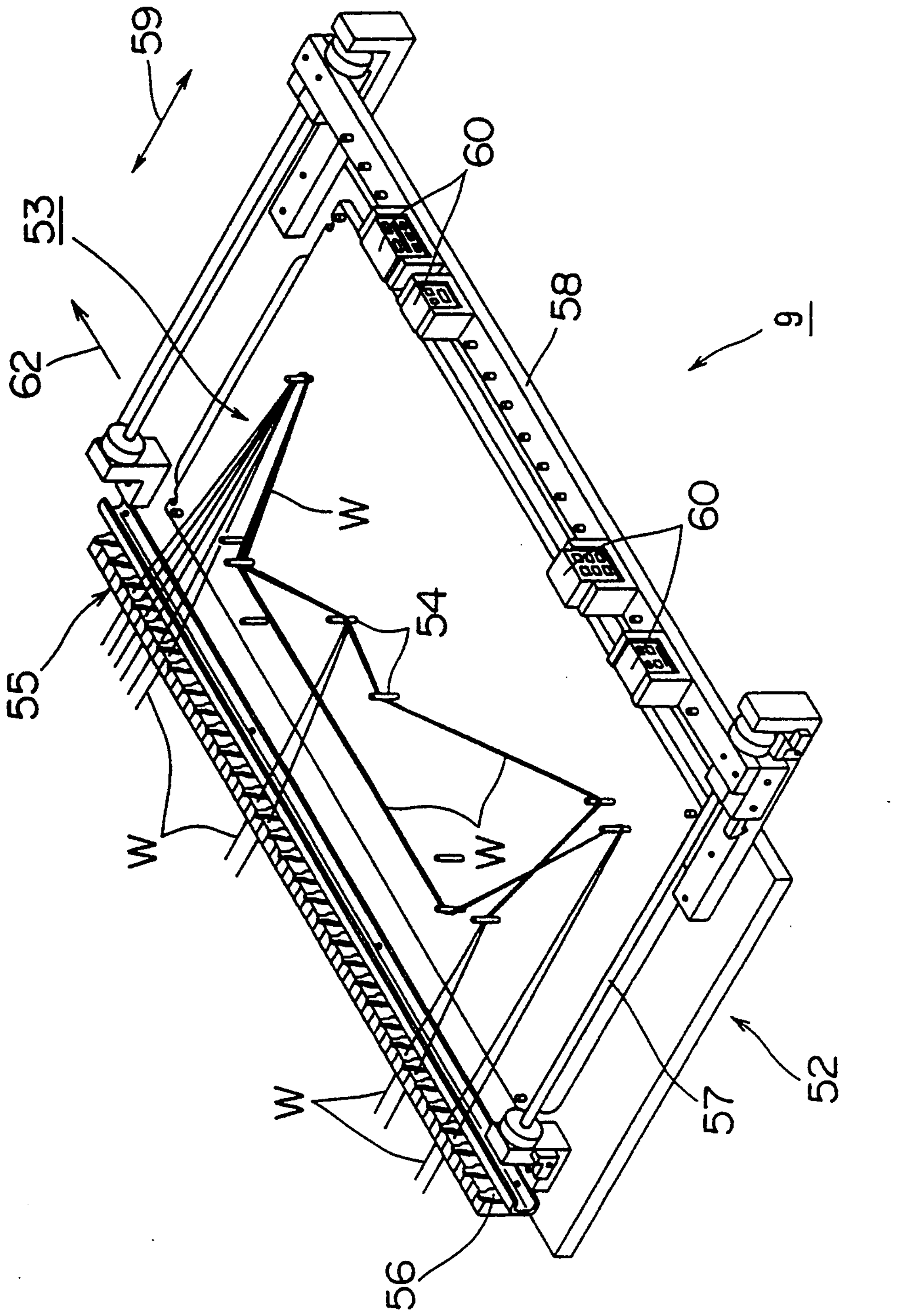
FIG. 6 is a perspective view illustrating a wire lay-out board to be carried on the wiring harness fabrication line.

FIG. 6 is a perspective view showing a wire lay-out board conveyed along the wiring harness fabrication line. In the wiring harness fabrication line, a wiring harness is gradually built up on the wire lay-out board 9 while the wire lay-out board as shown in FIG. 6 is being conveyed sequentially from one process step to another.

Referring to FIG. 6, a configuration of the wire lay-out board 9 will be simply described. The wire lay-out board 9 includes a base plate 52 and a pin board 53 detachably fixed to the base plate 52. The base plate 52 can be used by processes for fabricating any type of wiring harness, although the pin board 53 must be replaced with one suitable for a selected type of the wiring harness.

A number of lay-out pins 54, which are for catching electric wires thereround, are planted on the pin board 53. The base plate 52 has several wire clamps 55 aligned along its elongated front side, and a parallel comb 56 is placed inside the wire clamps 55. Electric wires W have their one ends pinched by the wire clamps 55 and pass through the parallel comb 56 and are hitched round specified ones of the lay-out pins 54 on the pin board 53 so as to accomplish the laying out. The other ends of the electric wires pass through the parallel comb 56 and are pinched by the wire clamps 55.

Thus, the ends of the electric wires W laid out on the wire lay-out board 9 run out of the wire clamps 55 toward the front (the upper left in FIG. 6) by a specified length. The ends of the electric wires W running out of the wire clamps 55 are kept lined up by the wire clamps. Thus, the stripping step of stripping insulative sheaths at the ends of the electric wires W, the crimping step of pressing the bared ends the electric wires W and terminals together in crimp contact with each other, and other steps are conducted by conveying the wire lay-out board 9 in a direction of arrow 62 at constant intermittent pitches.

The base plate 52 further includes a receptacle mounting plate 58 slidably attached thereto by a slide guide bar 57. The receptacle mounting plate 58 can slide in the direction of arrow 59 or the longitudinal direction of the base plate In the lay-out step of the electric wires W on the wire lay-out board 53, the stripping step of stripping insulative sheaths at the ends of the electric wires W, the crimping step of the pressing the bared ends of the electric wires W and terminals together in crimp contact with each other, and the like, the receptacle mounting plate 58 is set in position, retracted behind the pin board 53 as shown in FIG. 6. On the other hand, in the terminal inserting step of inserting a terminal into a connector receptacle, the receptacle mounting plate 58 is slid toward the frontmost position so that the terminal can be easily inserted into a connector receptacle 60 mounted on the receptacle mounting plate 58.

As has been described, the wire lay-out board 9 as shown in FIG. 6 has a configuration suitable for fabricating wiring harnesses by a machine in a mechanized wiring harnesses fabrication line.

Figure 7:
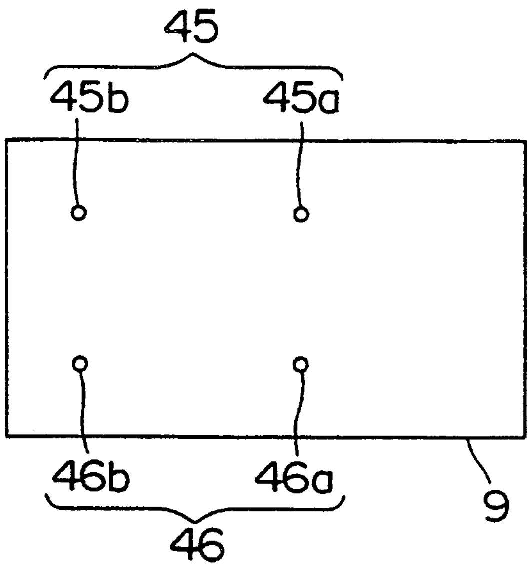
FIG. 7 is a diagram illustrating feed holes in the wire lay-out board used in the fabricating system according to the present invention.

FIG. 7 is a diagram illustrating the feed holes formed in the bottom side of the wire lay-out board 9. As shown in FIG. 7, at least two pairs 45 and 46 of feed holes are formed in the bottom side of the base plate 52 (see FIG. 6). One of the pairs of feed holes, 45, are formed, for example, on the left side of the widthwise extension of the wire lay-out board 9 orthogonal to the conveying direction while the other pair 46 of feed holes are formed on its right side. Either of the pairs 45 and 46 of feed holes has two holes **45*a* and 45*b* (or 46*a* and 46*b*), and an interval between the holes 45*a* and 45*b* (or 46*a* and 46*b*) is set to a predetermined size; in this embodiment, for example, the interval is 505 mm, which is equivalent to the interval between the positioning pins 39*a* and 39*b***.

In one of the pairs 45 of feed holes of the two pairs 45 and 46, the positioning pins are inserted in the module at the previous stage for the conveyance. In the other pair 46 of feed holes, the positioning pins are inserted in the module at the subsequent stage for the conveyance.

Figure 8:
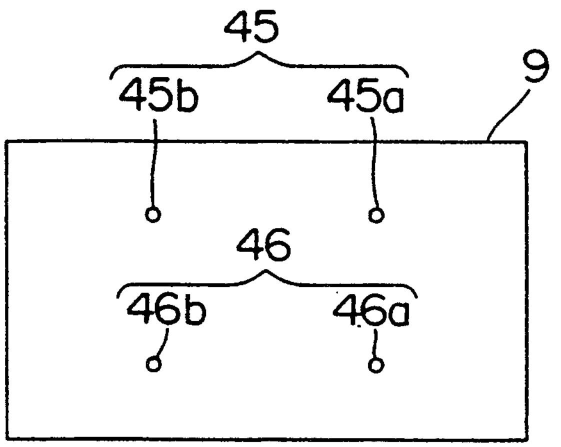
FIGS. 8 and 9 are diagrams showing modifications of feed holes in the wire lay-out board.
Figure 9:
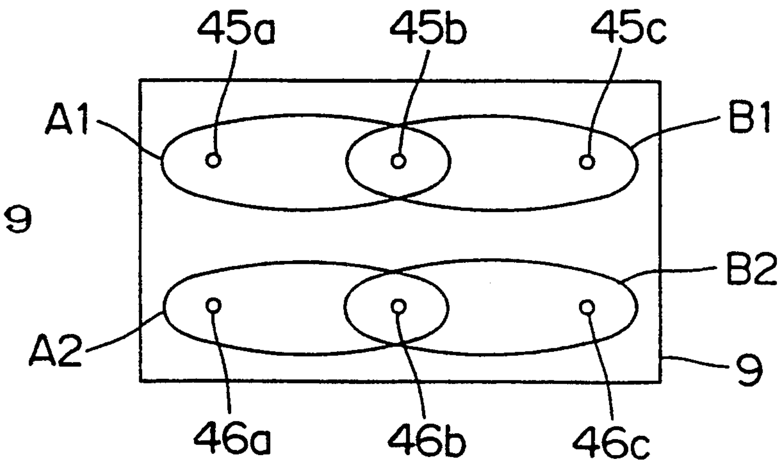

FIGS. 8 and 9 are diagrams showing variations of the feed holes formed in the wire lay-out board 9. The feed hole pairs 45 and 46 may be formed symmetrically about the center of the wire lay-out board 9, as shown in FIG. 8. Also, as shown in FIG. 9, there are formed six feed holes **45*a*, 45*b*, 45*c*, 46*a*, 46*b* and 46*c*, for example; and two pairs A1 and A2 consisting of the feed holes 45*a* and 45*b*, and 46*a* and 46*b* , respectively, or two pairs B1 and B2 consisting of the feed holes 45*b* and 45*c*, and 46*b* and 46*c*, respectively, may be used to convey the wire lay-out board 9**.

In the above-mentioned embodiment, the automated fabricating apparatuses for conducting the process steps are modularized for each step. Therefore, the number of modules in each of the steps of the fabrication line can be regulated in accordance with a type of a required wiring harness. If the type of the required wiring harness is changed because of the change of a design of the wiring harness or the like, the number of the modules of the fabrication line or the order of its arrangement may be changed in accordance with the change in the required wiring harness, and thus, the fabrication line which is pliably adjustable to the change of a design of a wiring harness can be easily assembled.

The advantage of this embodiment will be described more specifically below with reference to the accompanying drawings.

Figure 10A:
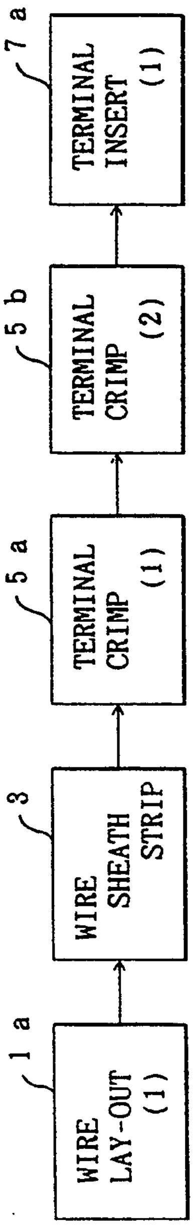
FIGS. 10A and 10B are diagrams illustrating advantages of one embodiment according to the present invention.
Figure 10B:
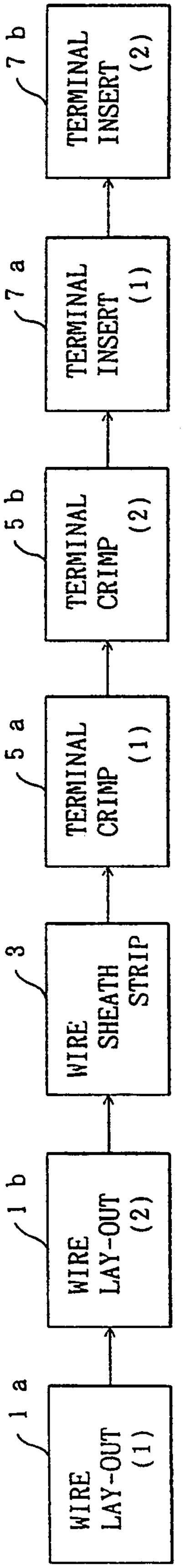
Figure 11A:
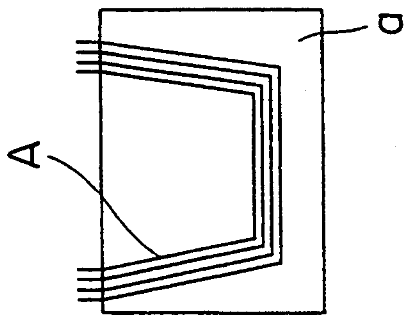
FIGS. 11A to 11D depict images of wire laying out modes of temporary binding units A to D laid out on wire lay-out boards a to d.
Figure 11B:
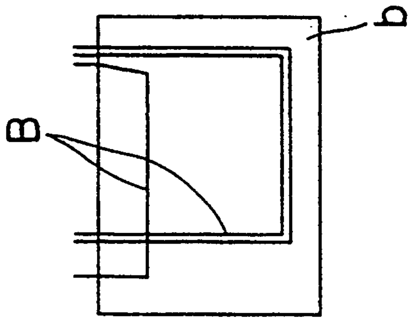
Figure 11C:
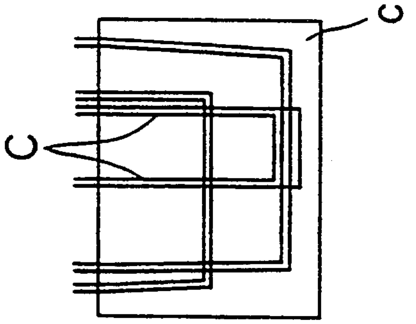
Figure 11D:
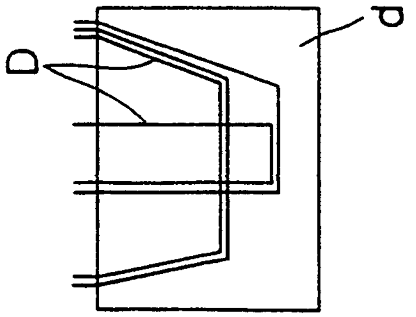

It is now assumed that the fabrication line of a wiring harness has a system architecture as illustrated in FIG. 10A; that is, the fabrication line includes a automated wire laying out module 1, a stripping module 3, two crimping modules **5*a* and 5*b*, and a terminal inserting module 7. However, when the situation is that a design of a wiring harness is changed, such that the number of circuits of the required wiring harness is to be increased, in this case, to cope with the changed of the design of a wiring harness, as shown in FIG. 10B, an automated wire laying out module 1*b* is added so that two automated wire laying out modules 1*a* and 1*b*** can be incorporated in the fabrication line, and a terminal inserting module *7b* is added so that the terminal inserting modules *7a* and *7b* can be provided in the fabrication line; and accordingly, the required wiring harness can be fabricated having an increased in circuit number due to the change in its design.

A simple change in the procedure allows the apparatus modularized in each process step to be increased or decreased in number, and hence, the automated fabricating machine can be pliably adjustable to the change of the design of a wiring harness without idling its own features.

As has been described, according to the present invention, an automated wiring harness fabricating system can be provided which can be pliably adjustable to any change in a type or design of a required wiring harness.

The present invention can also be applied to a wiring harness fabrication line suitable for the multi-item mixed flow production, as explained later.

Then, the automated wiring harness fabricating line suitable for the multi-item fixed flow production where the modularized apparatuses for each of the process steps are coupled to each other will be specifically explained.

Figure 12:
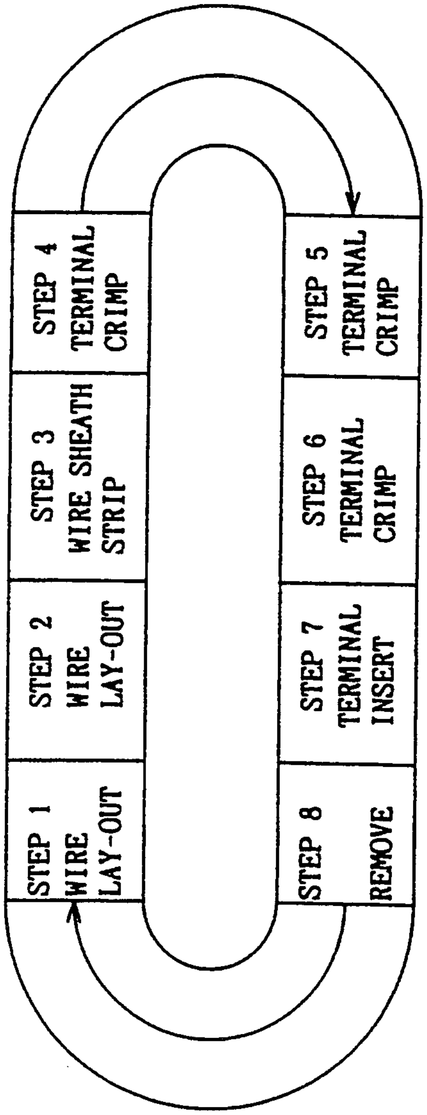
FIG. 12 is a block diagram showing a comparative wiring harness fabrication line suitable for the multi-item mixed flow production, presented to compare with one embodiment according to the present invention.

A case where the four temporary binding units A, B, C and D are fabricated in a wiring harness fabricating line as shown in FIG. 12 will be discussed.

FIG. 12 is a block diagram showing a comparative wiring harness fabrication line, presented for a comparison with the wiring harness fabrication line for the multi-item mixed flow production of the preferred embodiment according to the present invention.

The wiring harness fabrication line for the comparison has eight process steps: Steps 1 and 2 for automated wire laying out modules for automatically laying out electric wires on a wire lay-out board and cutting with measured length, Step 3 for a stripping module for stripping a sheath at an end of an electric wire; Steps 4, 5 and 6 for terminal crimping modules for pressing a bared electric wire and a terminal together in crimp contact with each other, Step 7 for a terminal inserting module for inserting terminal into a receptacle, and Step 8 for a removing module for removing a temporary binding units of wiring harness from a wire lay-out board. These eight steps are sequentially linked into a flow.

In the wiring harness fabrication line as shown in FIG. 12, a time occupied on each of the process steps 1 to 8 in the event of fabricating the four temporary binding units A, B, C and D is shown in Table 1.

TABLE 1

| | STEP 1 WIRE LAY-OUT | STEP 2 WIRE LAY-OUT | STEP 3 WIRE SHEATH STRIP | STEP 4 TERMINAL CRIMP | STEP 5 TERMINAL CRIMP | STEP 6 TERMINAL CRIMP | STEP 7 TERMINAL INSERT | STEP 8 REMOVE |
|---|---|---|---|---|---|---|---|---|
| A | 4 | 4 | (4 + 4) × 2 × 3 | 8 × 3.6 | 0 × 3.6 | 8 × 3.6 | (8) × 1 × 3.3 | 40 SEC. |
| | 38 SEC. | 38 SEC. | 48 SEC. | 29 SEC. | 0 SEC. | 29 SEC. | 27 SEC. | |
| B | 9 | 10 | (9 + 10) × 2 × 3 | 28 × 3.6 | 10 × 3.6 | 0 × 3.6 | (9 + 10) × 2 × 3.3 | 40 SEC. |
| | 86 SEC. | 95 SEC. | 108 SEC. | 101 SEC. | 36 SEC. | 0 SEC. | 119 SEC. | |
| C | 9 | 8 | (9 + 8) × 2 × 3 | 25 × 3.6 | 3 × 3.6 | 6 × 3.6 | (9 + 8) × 2 × 3.3 | 40 SEC. |
| | 86 SEC. | 76 SEC. | 102 SEC. | 90 SEC. | 11 SEC. | 22 SEC. | 113 SEC. | |
| D | 13 | 12 | (13 + 12) × 2 × 3 | 27 × 3.6 | 17 × 3.6 | 6 × 3.6 | (13 + 12) × 2 × 3.3 | 40 SEC. |
| | 124 SEC. | 114 SEC. | 150 SEC. | 98 SEC. | 62 SEC. | 22 SEC. | 165 SEC. | |
| TOTAL | 334 SEC. | 323 SEC. | 408 SEC. | 318 SEC. | 109 SEC. | 73 SEC. | 424 SEC. | 160 SEC. |

A wiring harness is usually comprised of a plurality of temporary binding units. For a wiring harness of model number X, for example, it may be comprised of four temporary binding units A, B, C and D. The temporary binding units A, B, C and D are different in length of wires, types of the wires, and the number of the wires from one another, and if electric wires different in thickness and type are used, conditions of stripping insulative sheaths at the ends of electric wires, types of terminals crimped to the bared ends of the electric wires, and terminal crimping conditions accordingly vary.

When the wiring harness of model number X is to be fabricated, wire lay-out boards a, b, c and d prepared for the temporary binding units A, B, C and D, respectively, are employed for the procedure of multi-item mixed flow productions of the temporary binding units A, B , C and D in the wiring harness fabrication line.

FIGS. 11A to 11D depict images of laying out modes or the temporary binding units A, B, C and D arranged on the wire lay-out boards a, b, c and d, respectively. In FIGS. 11A to 11D, all the electric wires used for actual temporary binding units are not shown, and the laying out modes are not practical but illustrative. The four temporary binding units A, B, C and D as shown in FIGS. 11A to 11D are formed of eight, nineteen, seventeen and twenty-five electric wires, respectively.

Although the temporary binding unit A is formed of eight electric wires, for example, four of the eight electric wires are laid out by the automated wire laying out module 1 at Step 1, and the remaining four electric wires are laid out by the automated wire laying out module 2 at Step 2. Then, it takes 38 seconds to complete the laying out of the four electric wires at Step 1, and 38 seconds to complete the laying out of the remaining four electric wires at Step 2.

At Step 3, foremost ends of the eight electric wires used for the laying out are stripped (there are sixteen ends in the eight electric wires). Assuming that it takes 3 seconds to strip one end of an electric wire, it should take 48 seconds to strip the sixteen ends of the eight electric wires.

Then, at Steps 4, 5 and 6, terminals are pressed together with the bared ends of the electric wires in crimp contact with each other by the terminal crimping module. There are sixteen of the bared ends of the electric wires which are to be in crimp-style contact with the terminals, and each of the terminals must be that which is of predetermined style for corresponding one of the ends of the electric wires. Thus, in this embodiment, terminals are crimped to eight of the ends of the electric wires at Step 4, Step 5 is skipped, and terminals are crimped to the remaining eight ends of the electric wires at Step 6. Assuming now that it takes 3.6 seconds to make a crimp contact of one terminal, it takes 29 seconds (8×3.6= 29 sec.) at Step 4, 0 second (0×3.6=0 sec.) at Step 5, and 29 seconds (8×3.6=29) at Step 6.

At Step 7 the terminals are inserted into connector receptacles by the terminal inserting module. There are sixteen terminals (8×2=16) because the eight electric wires have their respective opposite ends crimped to the terminals. There are, however, eight terminals so-called "disunited terminals" out of sixteen terminals. These disunited terminals are not inserted into the connector receptacles when the wiring harness is in its temporary binding state, but are inserted into connector receptacles when the temporary binding units are united together. It is assumed now that there are eight of the terminals which are to be inserted in the connector receptacles in uniting. If it takes 3.3 seconds to insert one terminal, the total time occupied at Step 7 is 27 seconds.

At last, it takes 40 seconds to take the temporary binding unit A out of the wire lay-out board at Step 8.

It also takes 6 seconds to convey the wire lay-out board between the adjacent process steps. Then, in order to fabricate the temporary binding unit A alone by using the wiring harness fabrication line shown in FIG. 12, the wire lay-out board may be transferred from step to step in a cycle time of 48+6=54 seconds where 6 seconds occupied on the conveyance between the adjacent steps is added to 48 seconds at Step 3 on which the longest processing time is occupied.

Table 1 also presents all data about the number of electric wires and the number of ends of the electric wires which are processed at each step, and a time occupied on completing the step.

In a practical fabrication of a wiring harness, for example, in fabricating the wiring harness of model number X, no such procedure that a required number of the temporary binding units A are first fabricated, a required number of the temporary binding units B are then fabricated, a required number of the temporary binding units C are fabricated, and at last a required number of the temporary binding units D are fabricated is employed. The reason is that if various temporary binding units are fabricated one type after another as required in number, a warehouse or the like is needed, as mentioned in the prior art description, to store products of the temporary binding unit A till finished products of the wiring harness of model number X are obtained, and the fabrication cannot be reasonably effected.

When the wiring harness of model number X are fabricated by using the wiring harness fabrication line as shown in FIG. 12, the temporary binding units A, B, C and D are fabricated on the basis of mixed flow production; initially the wire lay-out board "a" for fabricating the temporary binding unit A is set at Step 8, the wire lay-out board "b" for fabricating the temporary binding unit B is set at Step 7, the wire lay-out board "c" for fabricating the temporary binding unit C is set at Step 6, the wire lay-out board "d" for fabricating the temporary binding unit D is set at Step 5, and similarly the wire lay-out board "a" at Step 4, the wire lay-out board "b" at Step 3, the wire lay-out board "c" at Step 2, and the wire lay-out board "d" at Step 1 are respectively set. Thus, the temporary binding units A, B, C and D are fabricated on the bases of mixed flow production.

Table 2 shows a time occupied on each of the process steps in the event of fabricating the four temporary binding units A, B, C and D on the basis of mixed flow production.

TABLE 2

| | STEP 1 | STEP 2 | STEP 3 | STEP 4 | STEP 5 | STEP 6 | STEP 7 INSERT | STEP 8 | MAXIMUM |
|---|---|---|---|---|---|---|---|---|---|
| S1 | D 124 SEC. | C 76 SEC. | B 95 SEC. | A 29 SEC. | D 62 SEC. | C 22 SEC. | B 119 SEC. | A 40 SEC. | STEP 1 124 SEC. |
| S2 | A 38 SEC. | D 114 SEC. | C 102 SEC. | B 101 SEC. | A 0 SEC. | D 22 SEC. | C 113 SEC. | B 40 SEC. | STEP 2 114 SEC. |
| S3 | B 86 SEC. | A 38 SEC. | D 150 SEC. | C 90 SEC. | B 36 SEC. | A 29 SEC. | D 165 SEC. | C 40 SEC. | STEP 7 165 SEC. |
| S4 | C 86 SEC. | B 95 SEC. | A 48 SEC. | D 98 SEC. | C 11 SEC. | B 0 SEC. | A 27 SEC. | D 40 SEC. | STEP 4 98 SEC. |
| S1 | D 124 SEC. | C 76 SEC. | B 108 SEC. | A 29 SEC. | D 62 SEC. | C 22 SEC. | B 119 SEC. | A 40 SEC. | STEP 1 124 SEC. |

Referring to Table 2, at Stage S1, the temporary binding unit D is fabricated at Step 1, the temporary binding unit C is fabricated at Step 2, the temporary binding unit B is fabricated at Step 3, and the temporary binding unit A is fabricated at Step 4, and similarly the temporary binding units D, C, B, and A are fabricated at Steps 5, 6, 7 and 8. In this case, Step 1 requires the longest processing time of 124 seconds.

At Stage S2, the temporary binding units A, D, C, B, A, D, C and B are fabricated at Steps 1, 2, 3, 4, 5, 6, 7 and 8, respectively. Step 2 requires the longest processing time of 114 seconds at Stage S2.

At Stage S3, the temporary binding units B, A, D, C, B, A, D and C are fabricated at Steps 1, 2, 3, 4, 5, 6, 7 and 8, respectively, and Step 7 requires the longest processing time of 165 seconds.

At Stage S4 the temporary binding units C, B, A, D, C, B, A and D are fabricated at Steps 1, 2, 3, 4, 5, 6, 7 and 8, and Step 4 requires the longest processing time of 98 seconds.

The above Stages S1 to S4 are successively repeated fabricate the temporary binding units A, B, C and D on the basis of mixed flow production.

In conducting such a mixed flow production, a conveyance cycle time at which the wire lay-out board is to be transferred from step to step must be adjusted to the step occupying the longest processing time at each of Stages S1 to S4. Therefore, Stages S1 to S4 require the following operation times, respectively:

Stage S1: 124 sec. at Step 1+6 sec. of conveyance time between the adjacent steps=130 sec.

Stage S2: 114 sec. at Step 2+6 sec. of conveyance time between the adjacent steps=120 sec.

Stage S3: 165 sec. at Step 7+6 sec. of conveyance time between the adjacent steps=171 sec.

Stage S4: 98 sec. at Step 4+6 sec. of conveyance time between the adjacent steps=104 sec.

Thus, the temporary binding units A, B, C and D each of which is singular in number, or a set of the temporary binding units of model number X, are fabricated in a cycle time of 130 +120+171+104=525 sec.

Given now that the wiring harness fabrication line works for twenty hours a day, the production per day is expressed as follows:

$$20\times 3600\text{sec.}\times 0.8(\text{operation rate})\div 525\text{sec.}=109\text{sets.}$$

The production per month under the condition of 20-day operation is expressed as follows:

$$109\text{sets}\times 20\text{days}=2180\text{sets}$$

The productive efficiency of the wiring harness fabrication line presented for the comparison in FIG. 12 can be explained as in the above.

There will now be described below a case where the wiring harnesses of model number X consisting of the temporary binding units A, B, C and D as mentioned above are to be fabricated in a wiring harness fabrication line for the multi-item mixed flow production of a preferred embodiment according to the present invention.

Figure 13:
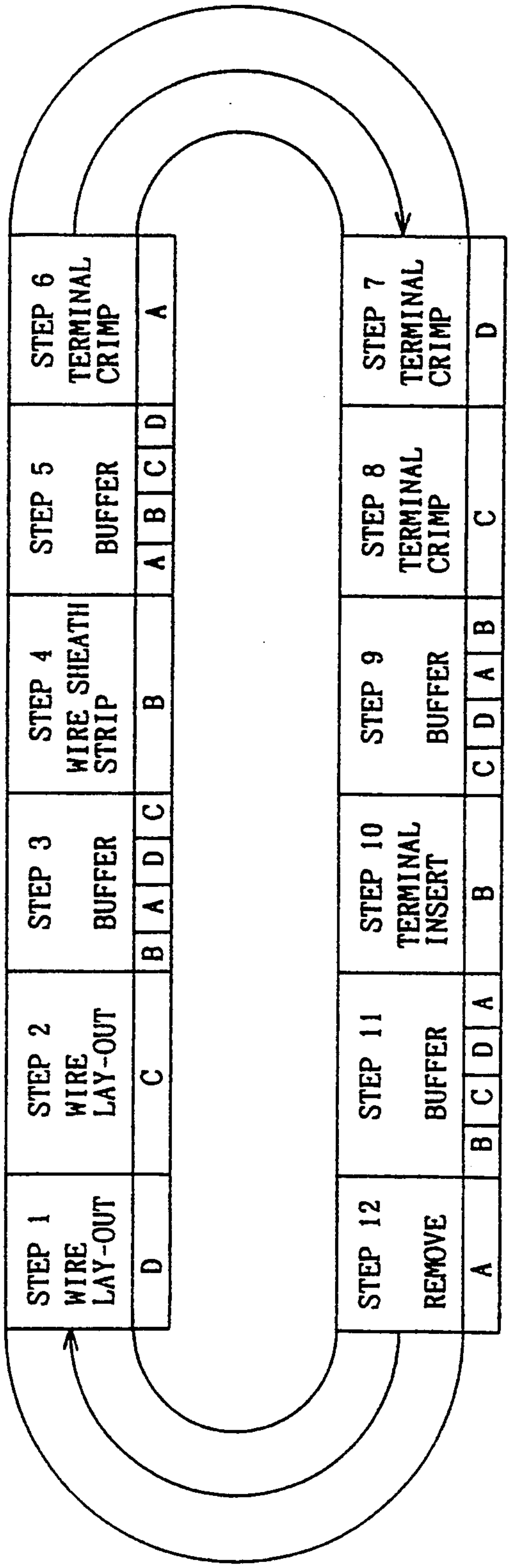
FIG. 13 is a block diagram illustrating a wiring harness fabrication line for the multi-item mixed flow production of one embodiment according to the present invention.

FIG. 13 is a block diagram illustrating the wiring harness fabrication line for the multi-item mixed flow production of the preferred embodiment according to the present invention. A feature of the wiring harness fabrication line shown in FIG. 13 is that buffers are incorporated in Steps 3, 5, 9 and 11. The remaining Steps 1, 2, 4, 6, 7, 8, 10 and 12 are organized completely the same with Steps 1, 2, 3, 4, 5, 6, 7 and 8 previously stated with reference to FIG. 12.

For example, at Steps 1 and 2, electric wires are laid out by automated wire laying out modules. Step 3 is a buffer where a wire lay-out board already processed at Step 2 is temporarily stored on standby. At Step 4, insulative sheaths at the ends of the electric wires laid out on the lay-out board are stripped by a stripping module. Step 5 is a buffer where the wire lay-out board processed at Step 4 is temporarily stored on standby. At Steps 6, 7 and 8, terminal crimping modules are provided to press terminals together with the bared ends of the electric wires in crimp contact with each other. Step 9 is a buffer where the wire lay-out board subjected to a terminal crimping operation at Step 8 is temporarily stored on standby. At Step 10, the terminals are inserted into connector receptacles by terminal inserting modules. Step 11 is a buffer where the wire lay-out board is temporarily stored on standby. At last, at Step 12, the finished temporary binding unit is removed from the wire lay-out board.

In this embodiment, one of the important features is that the buffers are incorporated where a processing subject is changed between any adjacent steps in a fabrication line consisting of a plurality of process steps. The buffers are utilized to temporarily store on standby the wire lay-out board already processed at the previous step and immediately feed the wire lay-out board to the subsequent step when an operation at the subsequent step is ready. Thus, when the wire lay-out board already processed at any previous step is conveyed to the succeeding step, the wire lay-out board is temporarily stored on standby in a buffer module if an operation at the succeeding step is not ready because the operation is being performed on the preceding wire lay-out board. In this way, the preceding step can commence its operation to the succeeding wire lay-out board without delay. Once an operation at the succeeding step is ready, the wire lay-out board is immediately supplied from the buffer module to the succeeding step. Thus, even if the processing subject and time at a step vary among the wire lay-out boards, such differences can be absorbed by the buffer, and consequently, the total processing time occupied on going around the whole fabrication line can be saved.

A processing time in the wiring harness fabrication line shown in FIG. 13 will be described in detail.

Table 3 presents a time occupied on each process step in fabrication of the temporary binding units A. B, C and D of the wiring harness of model number X as in the above-mentioned case in the wiring harness fabricating line shown in FIG. 13. As mentioned above, a buffer is interposed between adjacent steps of different operation subjects. Thus, there is no need to consider differences in a processing time among the steps, regarding a cycle in which the wire lay-out board is conveyed between the steps. This means that the conveyance cycle may be adjusted to the processing time at a step occupying the longest total time in the steps for the same process in fabricating the temporary binding units A, B, C and D.

TABLE 3

| | STEP 1 WIRE LAY-OUT | STEP 2 WIRE LAY-OUT | STEP 3 BUFFER | STEP 4 WIRE SHEATH STRIP | STEP 5 BUFFER | STEP 6 TERMINAL CRIMP | STEP 7 TERMINAL CRIMP | STEP 8 TERMINAL CRIMP | STEP 9 BUFFER | STEP 10 TERMINAL INSERT | STEP 11 BUFFER | STEP 12 REMOVE |
|---|---|---|---|---|---|---|---|---|---|---|---|---|
| A | 4<br>38 SEC. | 4<br>38 SEC. | | (4 + 4) × 2 × 3<br>48 SEC. | | 8 × 3.6<br>29 SEC. | 0 × 3.6<br>0 SEC. | 8 × 3.6<br>29 SEC. | | (8) × 1 × 3.3<br>27 SEC. | | 40 SEC. |
| B | 9<br>86 SEC. | 10<br>95 SEC. | | (9 + 10) × 2 × 3<br>108 SEC. | | 28 × 3.6<br>101 SEC. | 10 × 3.6<br>36 SEC. | 0 × 3.6<br>0 SEC. | | (9 + 10) × 2 × 3.3<br>119 SEC. | | 40 SEC. |
| C | 9<br>86 SEC. | 8<br>76 SEC. | | (9 + 8) × 2 × 3<br>102 SEC. | | 25 × 3.6<br>90 SEC. | 3 × 3.6<br>11 SEC. | 6 × 3.6<br>22 SEC. | | (9 + 8) × 2 × 3.3<br>113 SEC. | | 40 SEC. |
| D | 13<br>124 SEC. | 12<br>114 SEC. | | (13 + 12) × 2 × 3<br>150 SEC. | | 27 × 3.6<br>98 SEC. | 17 × 3.6<br>62 SEC. | 6 × 3.6<br>22 SEC. | | (13 + 12) × 2 × 3.3<br>165 SEC. | | 40 SEC. |
| TOTAL | 334 SEC. | 323 SEC. | | 408 SEC. | | 318 SEC. | 109 SEC. | 73 SEC. | | 424 SEC. | | 160 SEC. |

As shown in Table 3, Step 10 requires the longest total processing time in its terminal inserting process: 27 seconds are occupied on the terminal insertion as to the temporary binding unit A, 119 sec. for the terminal insertion as to the temporary binding unit B, 113 sec. for the terminal insertion as to the temporary binding unit C, and 165 sec. for the terminal insertion as to the temporary binding unit D. Thus, the conveyance cycle in this fabrication line can be set as expressed below:

$$27+119+113+165+(6+6+6+6)=448 \text{ sec.}$$

Four 6s in the above equation represent the conveyance time between any adjacent steps as to the temporary binding units A, B, C and D.

The productive efficiency of the wiring harness fabrication line can be expressed as follows:

Assuming that the fabrication line works for twenty hours a day, the production per day is expressed as follows:

$$20\times3600\text{sec.}\times0.8(\text{operation rate})\div448\text{sec.}=128 \text{ sets.}$$

The production per month under the condition of 20-day operation is obtained as follows:

$$128\text{sets}\times20\text{days}=2560\text{sets}$$

Therefore, this wiring harness fabrication line can enhance the production as can be seen in the following equations, compared with the wiring harness fabrication line as previously mentioned with reference to FIG. 12:

As to the production per day: 128−109=19 sets

As to the production per month: 2560−2180=380 sets

As has been described, a buffer is interposed between any adjacent steps of the different processing subjects, so that the wire lay-out board, when transferred from one step to another, can be temporarily stored on standby in the buffer even if a time occupied on processing an item of the wire lay-out board is short and the time occupied on processing another item of the subsequent wire lay-out board is long. Thus, the conveyance cycle of the wire lay-out board can be determined based upon a processing time occupied by a step of the longest processing time in the fabrication line, regardless of a difference in the processing time varying from item to item between the process steps. In this way, the wiring harness fabricating line can be operated with the greatest efficiency.

Changing the number of each of the process steps of the wiring harness fabrication line may be an alternative of the above-mentioned arrangement where the buffers are incorporated in the wiring harness fabrication line, and thereby the productive efficiency of the wiring harness fabrication Line can be enhanced.

Figure 14:
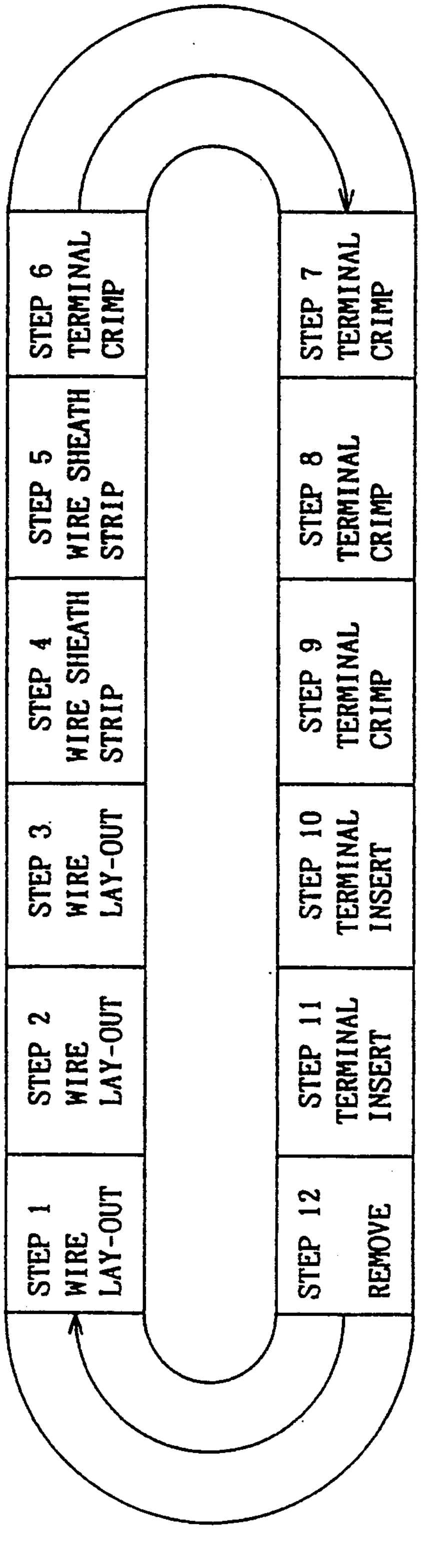
FIG. 14 is a block diagram illustrating a wiring harness fabrication line for the multi-item mixed flow production of another embodiment according to the present invention.

FIG. 14 is a block diagram illustrating a wiring harness fabricating line where its processing modules are selectively added, or the number of a specified process step is increased, so as to enhance the productive efficiency. The wiring harness fabrication line as shown in FIG. 14 is improved, compared with the wiring harness fabrication line as shown in FIG. 12, in that additional wire laying out step, stripping step, crimping step and inserting step are incorporated, one to each individual step. Incorporating additional steps this way, dispersive processing times at the steps in the mixed flow production of various temporary binding units can be evened out.

A case of fabricating the four temporary binding units A, B, C and D of the wiring harness of model number X will now be discussed. As stated before, the temporary binding unit A, B, C and D consist of eight, nineteen, seventeen and twenty-five electric wires, respectively.

In case where the wiring harness fabrication line is utilized to fabricate the four temporary binding units A, B, C and D, times occupied on conducting Steps 1 to 12 are presented in Table 4.

TABLE 4

| | STEP 1 WIRE LAY-OUT | STEP 2 WIRE LAY-OUT | STEP 3 WIRE LAY-OUT | STEP 4 WIRE SHEATH STRIP | STEP 5 WIRE SHEATH STRIP | STEP 6 TER-MINAL CRIMP | STEP 7 TER-MINAL CRIMP | STEP 8 TER-MINAL CRIMP | STEP 9 TER-MINAL CRIMP | STEP 10 TER-MIN-AL IN-SERT | STEP 11 TER-MIN-AL IN-SERT | STEP 12 RE-MOVE |
|---|---|---|---|---|---|---|---|---|---|---|---|---|
| A | 3 29 SEC. | 3 29 SEC. | 2 19 SEC. | 4 × 2 × 3 24 SEC. | 4 × 2 × 3 24 SEC. | 0 × 3.6 0 SEC. | 8 × 3.6 29 SEC. | 0 × 3.6 0 SEC. | 8 × 3.6 29 SEC. | 4 × 3.3 13 SEC. | 4 × 3.3 13 SEC. | 40 SEC. |
| B | 7 67 SEC. | 6 57 SEC. | 6 57 SEC. | 57 SEC. | 57 SEC. | 14 × 3.6 51 SEC. | 14 × 3.6 51 SEC. | 10 × 3.6 36 SEC. | 0 × 3.6 0 SEC. | 19 × 3.3 63 SEC. | 19 × 3.3 63 SEC. | 40 SEC. |
| C | 6 57 SEC. | 6 57 SEC. | 5 48 SEC. | 51 SEC. | 51 SEC. | 13 × 3.6 47 SEC. | 12 × 3.6 44 SEC. | 3 × 3.6 11 SEC. | 6 × 3.6 22 SEC. | 17 × 3.3 57 SEC. | 17 × 3.3 57 SEC. | 40 SEC. |
| D | 9 86 SEC. | 8 76 SEC. | 8 76 SEC. | 75 SEC. | 75 SEC. | 14 × 3.6 51 SEC. | 13 × 3.6 47 SEC. | 17 × 3.6 62 SEC. | 6 × 3.6 22 SEC. | 25 × 3.3 83 SEC. | 25 × 3.3 83 SEC. | 40 SEC. |
| TOTAL | 239 SEC. | 219 SEC. | 200 SEC. | 207 SEC. | 207 SEC. | 149 SEC. | 171 SEC. | 109 SEC. | 73 SEC. | 216 SEC. | 216 SEC. | 160 SEC. |

The temporary binding unit A consists of eight electric wires, and three of the eight wires are laid out at Step 1, three of the remaining ones are laid out at Step 2, and the still remaining two are laid out at Step 3, respectively, in the automated wire laying out module. Completing each of Step 1 and Step 2 occupies 29 seconds, and completing Step 3 occupies 19 seconds.

At steps 4 and 5, sheaths at the ends of the electric wires already laid out on the wire lay-out board are stripped by the stripping module. Since there are sixteen (8×2=16) of the ends of the electric wires laid out on the wire lay-out board, and therefore, eight of the ends are stripped at Step 4, and the remaining eight of the ends are stripped at Step 5. It takes 3 seconds to strip one end, and therefore, each of Step 4 and Step 5 occupies 24 seconds.

Subsequently, at Steps 6, 7, 8 and 9, terminals are pressed together with the bared ends of the electric wires in crimp contact. There are sixteen of the ends of the electric wires which are to be crimped to the terminals, and each end must be crimped to a corresponding terminal of predetermined mode. In this embodiment, the terminal crimping modules at Steps 7 and 9 in all the modules at Steps 6 to 9 are used to make a crimp contact with terminals. Since it takes 3.6 seconds to make a crimp contact with one terminal, Step 7 occupies 29 seconds (8×3.6=29) if eight of the ends are to be pressed in crimp contact with the terminals, and Step 9 also occupies 29 seconds (8×3.6=29) if the remaining eight of the ends are to be pressed in crimp contact with the terminals. In the course of fabricating the temporary binding unit A, crimping is not conducted at Step 6 and Step 8, and therefore, each these steps occupies 0 second.

After that, the terminals are inserted into connector receptacles by the terminal inserting modules at Steps 10 and 11. The terminals are pressed in crimp contact with the opposite ends of the eight electric wires, and sixteen (8×2=16) terminals are to be inserted in the connector receptacles. Eight of them are the so-called disunited terminals which should not be inserted into the connector receptacles when they are temporarily bound. Thus, the remaining eight terminals are inserted into the connector receptacles. It takes 3.3 seconds to insert one terminal, and each of Step 10 and Step 11 occupies 4×3.3=13 sec.

Eventually, the temporary binding unit A is removed from the wire lay-out board at Step 12. It takes 40 seconds.

Similarly, in fabricating the temporary binding unit B, seven of the electric wires are laid out on a wire lay-out board at Step 1 in 67 seconds, six of the electric wires are laid out on the wire lay-out board at Step 2 in 57 seconds, and the remaining six electric wires are laid out on the wire lay-out board at Step 3 in 57 seconds. Stripping at Step 4 occupies 57 seconds, and stripping at Step 5 also occupies 57 seconds. Terminal-crimping at Step 6 occupies 51 seconds, terminal-crimping at Step 7 also occupies 51 seconds, terminal-crimping at Step 8 occupies 36 seconds, and Step 9 without crimping operation occupies 0 second. Terminal-inserting at Step 10 occupies 63 seconds, terminal-inserting at Step 11 also occupies 63 seconds, and removing the temporary binding unit B from the wire lay-out board at Step 12 occupies 40 seconds.

The temporary binding unit C consists of seventeen electric wires, and a time occupied on fabricating it at Steps 1 to 12 is stated as follows; six of the electric wires are laid out on a wire lay-out board at Step 1 in 57 seconds, six of the electric wires are laid out on the wire lay-out board at Step 2 in 57 seconds, and the remaining five electric wires are laid out on the wire lay-out board at Step 3 in 48 seconds. All the ends of the electric wires are stripped at Steps 4 and 5 in 51 seconds, respectively, and terminals are pressed in crimp contact at Steps 6 to 9; these steps occupy 47 seconds, 44 seconds, 11 seconds, and 22 seconds, respectively. Furthermore, a time occupied on inserting terminals at each of Steps 10 and 11 is 57 seconds. Removing step at the final stage occupies 40 seconds.

The temporary binding unit D consists of twenty-five electric wires, and nine of them are laid out on a wire lay-out board in Step 1 in 86 seconds. Eight of the electric wires are laid out on the wire lay-out board at Step 2 in 76 seconds, and the remaining eight electric wires are laid out on the wire lay-out board at Step 3 in 76 seconds. 75 seconds is occupied on stripping sheaths at the ends of the electric wires at each of Steps 4 and 5. Terminals are pressed in crimp contact at Steps 6 to 9, and the terminals used in this process vary in number from step to step; it takes 51 seconds at Step 6, 47 seconds at Step 7, 62 seconds at Step 8, and 22 seconds at Step 9. 83 seconds is occupied on terminal-inserting at each of Steps 10 and 11, and 40 seconds is occupied on finally removing the temporary binding unit D from the wire lay-out board at Step 12.

A case where the above-mentioned temporary binding units A, B, C and D are fabricated on the basis of mixed flow production. At the beginning of the mixed flow production, for example, the wire lay-out board "a" used for fabricating the temporary binding unit A is set in Step 12, the wire lay-out board "b" used for fabricating the temporary binding unit B is set in Step 11, the wire lay-out board "c" for fabricating the temporary binding unit C is set in Step 10, and the wire lay-out board "d" for fabricating the temporary binding unit D is set in Step 9. Also set are the wire lay-out board "a" in Step 8, the wire lay-out board "b" in Step 7, the wire lay-out board "c" in Step 6, the wire lay-out board "a" in Step 5, the wire lay-out board "a" in Step 4, the wire lay-out board "b" in Step 3, the wire lay-out board "c"0 in Step 2, and the wire lay-out board "d" in Step 1, respectively.

The mixed flow production of the temporary binding units A, B, C and D are commenced under such a condition.

Table 5 presents a time occupied on each stage in fabricating the four temporary binding units A, B, C and D on the basis of mixed flow production.

TABLE 5

| | STEP 1 | STEP 2 | STEP 3 | STEP 4 | STEP 5 | STEP 6 | STEP 7 | STEP 8 | STEP 9 | STEP 10 | STEP 11 | STEP 12 | MAXIMUM |
|---|---|---|---|---|---|---|---|---|---|---|---|---|---|
| S1 | D 86 SEC. | C 57 SEC. | B 57 SEC. | A 24 SEC. | D 75 SEC. | C 47 SEC. | B 51 SEC. | A 0 SEC. | D 22 SEC. | C 57 SEC. | B 63 SEC. | A 40 SEC. | STEP 1 86 SEC. |
| S2 | A 29 SEC. | D 76 SEC. | C 48 SEC. | B 57 SEC. | A 24 SEC. | D 51 SEC. | C 44 SEC. | B 36 SEC. | A 29 SEC. | D 83 SEC. | C 57 SEC. | B 40 SEC. | STEP 10 83 SEC. |
| S3 | B 67 SEC. | A 29 SEC. | D 76 SEC. | C 51 SEC. | B 57 SEC. | A 0 SEC. | D 47 SEC. | C 11 SEC. | B 0 SEC. | A 13 SEC. | D 83 SEC. | C 40 SEC. | STEP 11 83 SEC. |
| S4 | C 57 SEC. | B 57 SEC. | A 19 SEC. | D 75 SEC. | C 51 SEC. | B 51 SEC. | A 29 SEC. | D 62 SEC. | C 22 SEC. | B 63 SEC. | A 13 SEC. | D 40 SEC. | STEP 4 75 SEC. |
| S1 | D 86 | C 57 | B 57 | A 24 | D 75 | C 47 | B 51 SEC. | A 0 SEC. | D 22 SEC. | C 57 SEC. | B 63 SEC. | A 40 SEC. | STEP 1 86 SEC. |

TABLE 5-continued

| STEP 1 | STEP 2 | STEP 3 | STEP 4 | STEP 5 | STEP 6 | STEP 7 | STEP 8 | STEP 9 | STEP 10 | STEP 11 | STEP 12 | MAXIMUM |
|---|---|---|---|---|---|---|---|---|---|---|---|---|
| SEC. | SEC. | SEC. | SEC. | SEC. | SEC. | | | | | | | |

As will be recognized in Table 5, after a sequence of process steps in each of Stages S1 to S4 are all completed, trains of the four wire lay-out boards proceed by one step and then undergo another sequence of process steps in the next one of the stages. Hence, regarding a state of each process step, the round of stages S1 to S4 are repeated in order like S1→S2→S3→S4→S1→S2→ and so forth.

Thus, the step occupying the longest processing time at Stage 1 is Step 1 which occupies 86 seconds. Adding 6 seconds for the conveyance to the subsequent step, 92 seconds is occupied on Step 1.

The step occupying the longest processing time at Stage 2 is Step 10 which occupies 83 seconds. Adding 6 seconds for the conveyance to the subsequent step, 89 seconds is occupied on Step 10.

The step occupying the longest processing time at Stage 3 is Step 11 which occupies 83 seconds. Adding 6 seconds for the conveyance to the subsequent step, 89 seconds is occupied on Step 11.

The step occupying the longest processing time at Stage 4 is Step 4 which occupies 75 seconds. Adding 6 seconds for the conveyance to the subsequent step, 81 seconds is occupied on Step 4.

Thus, a set of the temporary binding units A, B, C and D are finished in a cycle type of the total of the longest processing times at Stage S1 to S4, 92 sec.+89 sec.+89 sec.+81 sec.=351 sec., in this wiring harness fabrication line.

Assuming that the wiring harness fabrication line is operated 20 hours a day, the production per day is obtained by the following equation:

$$20\times3600\times0.8(\text{operation rate})\div351\text{sec.}=164\text{sets}$$

The production per month under the condition that the wiring harness fabrication line is operated 20 days a month is obtained as follows:

$$164\text{sets}\times20\text{days}=3280\text{sets}$$

Also, as has been described, the productive efficiency in the fabrication line can be further enhanced without buffers if the number of the modules of each process step in the fabrication line can be increased.

The increase of the modules in number may be performed under such a standard that a processing time of the step which occupies the longest time compared with a processing time occupied on any other step should be evened off. Specifically, in the case where there are two of the terminal-crimping steps each of which occupies a processing time longer than the processing time of any other process step, the number of the modules of the terminal-crimping steps may be increased from two to three or four so as to divide the total processing time of the terminal-crimping steps into three or four, and a processing time per step can be decreased. This allows the processing time occupied on one of the terminal-crimping steps to be almost equal to the processing time on any other process step. In this way, the productive efficiency in the wiring harness fabrication line can be enhanced.

Although a case where no buffer is incorporated has been presented in the context of the description of the preferred embodiment of the present invention, buffers may be interposed between any of the following step pairs; the steps 3 and 4, the steps 5 and 6, the steps 9 and 10, and the steps 11 and 12, so that the productive efficiency in this fabrication line can be further enhanced. As previously mentioned, the inter-position of the buffers permits the wire lay-out board conveying cycle to be determined based upon the step occupying the longest processing time. As shown in Table 4, the total processing time occupied on fabricating the temporary binding units A, B, C and D at Step 1 is the longest at 239 seconds, and therefore, the four temporary binding units A, B, C and D can be fabricated in a cycle time as expressed as follows:

$$239+(6\times4)=263\text{sec.}$$

where the time occupied on conveying the wire lay-out board between any adjacent steps is added to the total fabrication time. Thus, assuming that the fabrication line is operative twenty hours a day, the production per day can be expressed as follows:

$$20\times3600\text{sec.}\times0.8(\text{operation rate})\div263=219\text{sets.}$$

Assuming that the line is operative twenty days a month, the production per month can be expressed as follows:

$$219\text{sets}\times20\text{days}=4380\text{sets}$$

Compared with a case where the buffers are not incorporated, an increase in production can be expected by 55 sets per day or 1100 sets per month.

Incorporating the buffers in the wiring harness fabrication line permits the productive efficiency to be further enhanced.

The wiring harness fabrication line as previously mentioned is disclosed herein as an example, and therefore, additional steps such as a check step may be incorporated besides the above-mentioned steps of wire laying out, stripping, pressing in crimp-style contact, inserting a terminal, and removing a temporary binding unit.

Also, the wiring harness of model number X consisting of the temporary binding units A, B, C and D in the above embodiment is set forth only as an example. Thus, the fabrication line of the present invention is adjustable to any model number of wiring harness and is operable soon and effectively even if a variety of wiring harnesses of different model numbers must be fabricated. Thus, the present invention provides an improved wiring harness fabrication line capable of effectively fabricating wiring harnesses by changing the number of steps incorporated therein depending upon the model number of the desired wiring harness.

There can be various modifications of the above preferred embodiments according to the present invention without departing from the true scope of the description of the appended claims, and it is not intended that the present invention be restricted to the above preferred embodiments

What we claim is:

1. An automated method for producing a wiring harness, comprising:

laying out electric wires coated with insulative sheaths in an array on a wire lay-out board and cutting said wires to a predetermined length with a wire laying out step module;

stripping said insulative sheaths from ends of said wires with a stripping module;

pressing the stripped wire ends together with a terminal to provide a crimp contact in a crimping step module; and inserting said terminals in crimp contact with said wire ends into a connector in an inserting step module, wherein said modules are plural, independent modules connected to one another in a series, said modules including a base frame and a conveyor mounted on said base frame, wherein said conveyor includes a main conveyor element extending along said base frame and a projecting element extending from an edge of said base frame and intruding into a base frame of an adjacent module, wherein a number of modules are arranged together to perform the laying out, stripping, pressing and inserting steps so as to generally even out processing times of each of said steps.

2. An automated method for producing a wiring harness as claimed in claim 1, further including the steps of:

temporarily storing the wire lay-out boards from a preceding module in a buffer module connected in series with said other modules, and feeding the wire lay-out board from the buffer module to a succeeding module after a predetermined time.

3. An automated wiring harness fabricating system comprising:.

plural independent modules connected in series, wherein said system conveys a wire lay-out board sequentially along the series of modules from one module to a next module, said modules each including a base frame and a conveyor mounted on said base frame for conveying a wire lay-out board, said conveyor including a main conveyor element extending along said base frame and a projecting element extending from an edge of said base frame and intruding into a base frame of an adjacent module located on the side proximate to said projecting element, said modules including:

a wire laying out step module arranged for laying out electric wires coated with insulative sheaths in an array and cutting the electric wires to a predetermined length;

a stripping step module arranged for stripping the insulative sheaths from ends of the electric wires;

a crimping step module arranged for pressing terminals together with the stripped ends of the electric wires in a crimp contact; and an inserting step module arranged for inserting the terminals in crimp contact with the ends of the electric wires into a connector;

wherein a predetermined number of said modules are arranged together to perform the steps.

4. An automated wiring harness fabricating system according to claim 3, wherein, in adjacent modules which are connected to each other, the conveyor in a first module is mounted on a front half of the base frame for the first module with respect to a direction orthogonal to a wire lay-out board conveying direction, and the conveyor in a second module is mounted on a rear half of the base frame of the second module with respect to the direction orthogonal to the wire lay-out board conveying direction, whereby the projecting element of the conveyor in the first module partially overlaps with the main conveyor element of the conveyor in the second module, such that the conveyors of the first module and the second module are parallel with each other, but not in contact with one another.

5. An automated wiring harness fabricating system according to claim 3, wherein said conveyor includes a movable element reciprocally movable in a wire lay-out board conveying direction and a direction opposite to said wire lay-out board conveying direction, and positioning pins provided in said movable element for positioning and holding a wire lay-out board.

6. An automated wiring harness fabricating system according to claim 5, wherein said movable element includes an extension of a predetermined size in a direction along its movement, and said movable element is provided with two said positioning pins at a predetermined interval in the direction of movement of the movable element.

7. An automated wiring harness fabricating system according to claim 5, wherein said positioning pins are alternatively switched between a state where they protrude from said movable element so as to fit to a wire lay-out board and a state where they do not either protrude from said movable element nor fit to a wire lay-out board.

8. An automated wiring harness fabricating system according to claim 6, wherein said positioning pins are alternatively switched between a state where they protrude from said movable element so as to fit to a wire lay-out board and a state where they do not either protrude from said movable element nor fit to a wire lay-out board.

9. An automated wiring harness fabricating system according to claim 5, wherein said wire lay-out board has feed holes in its reverse side with which the positioning pins provided in said movable element can engage.

10. An automated wiring harness fabricating system according to claim 9, wherein said wire lay-out board includes a base plate, and a pin board detachably fixed to the base plate, said pin board having a plurality of laying out pins on a surface to hitch therearound an electric wire arranged in an array, wherein said feed holes are formed in said base plate on a reverse side of said base plate from said pin board.

11. An automated wiring harness fabricating system according to claim 3, further comprising a buffer module interposed between two of said modules, said buffer module included for temporarily storing the wire lay-out board transferred from a preceding module, and feeding the wire lay-out board to a succeeding module at a predetermined time.

12. An automated wiring harness fabricating system according to claim 11, wherein said buffer module includes a base frame, and a conveyor mounted on said base frame for conveying a wire lay-out board, said conveyor including a main conveyor element extending along said base frame, and a projecting element extending from an edge of said base frame and intruding into a base frame of an adjacent module.

13. An automated wiring harness fabricating system comprising:

plural independent modules connected in series, wherein said system conveys a wire lay-out board sequentially along the series of modules from one module to a next module, said modules each including a base frame and a conveyor mounted on said base frame for conveying a wire lay-out board, said conveyor including a main conveyor element extending along said base frame and a projecting element extending from an edge of said base frame and intruding into a base frame of an adjacent module located on the side proximate to said projecting element, said modules including:

a wire laying out step module arranged for laying out electric wires coated with insulative sheaths in an array and cutting the electric wires to a predetermined length;

a stripping step module arranged for stripping the insulative sheaths from ends of the electric wires;

a crimping step module arranged for pressing terminals together with the stripped ends of the electric wires in a crimp contact; and an inserting step module arranged for inserting the terminals in crimp contact with the ends of the electric wires into a connector;

wherein a predetermined number of said modules are arranged together to perform the steps so as to generally even out processing times of the steps.

14. An automated wiring harness fabricating system according to claim 13, further comprising a buffer module interposed between two of said modules, said buffer module included for temporarily storing the wire lay-out board transferred from a preceding module, and feeding the wire lay-out board to a succeeding module at a predetermined time.

* * * * *